United States Patent [19]

Schindler

[11] Patent Number: 5,059,066
[45] Date of Patent: Oct. 22, 1991

[54] SYSTEM AND METHOD FOR DISPOSAL OF WASTE

[76] Inventor: Peter V. Schindler, 11615 Amigo Ave., Northridge, Calif. 91326

[21] Appl. No.: 510,748

[22] Filed: Apr. 18, 1990

[51] Int. Cl.$^5$ .................. E02D 27/38; B09B 5/00; B01D 21/00
[52] U.S. Cl. .................. 405/210; 405/128; 405/52; 210/170; 210/257.1; 210/747
[58] Field of Search .......... 405/52, 210, 128; 210/170, 747, 257.1

[56] References Cited

U.S. PATENT DOCUMENTS

| 1,120,351 | 12/1914 | Weston | 210/257.1 X |
| 3,145,538 | 8/1964 | Young | 405/210 |
| 3,145,539 | 8/1964 | Estes | 405/210 |
| 3,429,128 | 2/1969 | Stafford | 405/210 |
| 3,528,462 | 9/1970 | Quase | 141/284 |
| 3,889,477 | 6/1975 | Tam | 405/210 |
| 3,961,488 | 6/1976 | Ovsttun | 405/210 |
| 4,200,411 | 4/1980 | Brown | 405/210 |
| 4,231,873 | 11/1980 | Swigger | 405/210 X |
| 4,623,452 | 11/1986 | Peterson | 210/170 X |
| 4,818,399 | 4/1989 | Midkiff | 210/257.1 X |
| 4,944,872 | 7/1990 | Kantor | 405/210 X |

Primary Examiner—David H. Corbin
Assistant Examiner—Arlen L. Olsen
Attorney, Agent, or Firm—Julian Caplan

[57] ABSTRACT

Plural liquid- and gas-tight, large capacity upright cylinders having closed tops and bottoms are positioned connected together resting on the bottom of a body of water. A first cylinder, initially filled with water, is loaded with waste (potentially consisting of various types of trash including solids of different specific gravity, oil and other liquids and entrapped gases created by decomposition). Liquid displaced by the trash is pumped to the next cylinder. A third cylinder may be fabricated on site or transported to the site in time to replace the second cylinder as it is being filled after the first is completed. Displaced gases are accumulated in the tops of the cylinders pipe to a location where they may be filterted or otherwise purified or burned.

17 Claims, 3 Drawing Sheets

SYSTEM AND METHOD FOR DISPOSAL OF WASTE

BACKGROUND OF THE INVENTION

1. Field of the Invention.

This invention relates to a new and improved system and method for the disposal of waste material including household and industrial waste as well as toxic materials. The materials are stored in underwater cylinders closed at top and bottom. Use of the invention eliminates ground water pollution as contrasted with land fill disposal of similar materials. Air pollution is eliminated by containing gases which are generated by decomposition of the waste. Need for land fill is minimized. The size of the storage facilities is reduced.

2. Description of Related Art.

Underwater storage of materials in tanks resting on the bottom of an ocean or fresh water site is well known in the art. Various of the prior art references show a system using tanks for retaining mixtures of water and crude oil or oil derivatives, waste water containing sediment and outflow of sewage disposal systems. The broad concept of providing several underwater vessels whereby the water from one is displaced to the other is known in the art. The present invention differs from such prior systems in a number of particulars. Most importantly, the waste is charged into one container previously filled with water and the water displaced is pumped into an adjoining container initially containing water and no waste. Meanwhile, still a third container may be erected in the water so that when the first container is full, additional waste may be charged into the second container and the displaced water pumped into the third container.

SUMMARY OF THE INVENTION

The present invention employs plural liquid- and gas-tight large capacity upright cylinders which may be circular or other shape in cross-section having closed tops and bottoms. The bottom, which preferably rests on the bottom of a body of water, is sufficiently strong to resist piercing or puncture from the trash contained in the cylinder or sharp objects projecting from the bottom of a body of water. Adjacent the top, mesh or other barrier is installed to prevent waste of low specific gravity from clogging the top of the cylinder. The area at the top of the cylinder is free to permit liquids and gases to be collected therein.

Means are provided to lock a plurality of adjacent cylinders together better to resist turbulence and pressure.

Water jets may be positioned at the bottom to clear a site upon which the bottom may rest.

Thus, in summary, at least two and preferably three cylinders are provided. Waste is charged into the first cylinder displacing water which has heretofore partially filled the cylinder. The more dense waste sinks. Weight of the water above the solid waste compacts the same. The displaced water is transferred to the second cylinder. Preferably, while the first cylinder is being filled, a third cylinder is being erected or constructed in the water. After the first cylinder is completed, the waste is charged into the second cylinder and the displaced water therefrom is directed to the third cylinder.

Gas generated within all of the filled cylinders is collected and may be disposed of in various ways such as by filtering and venting, by burning, or by storage under pressure in separate vessels.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
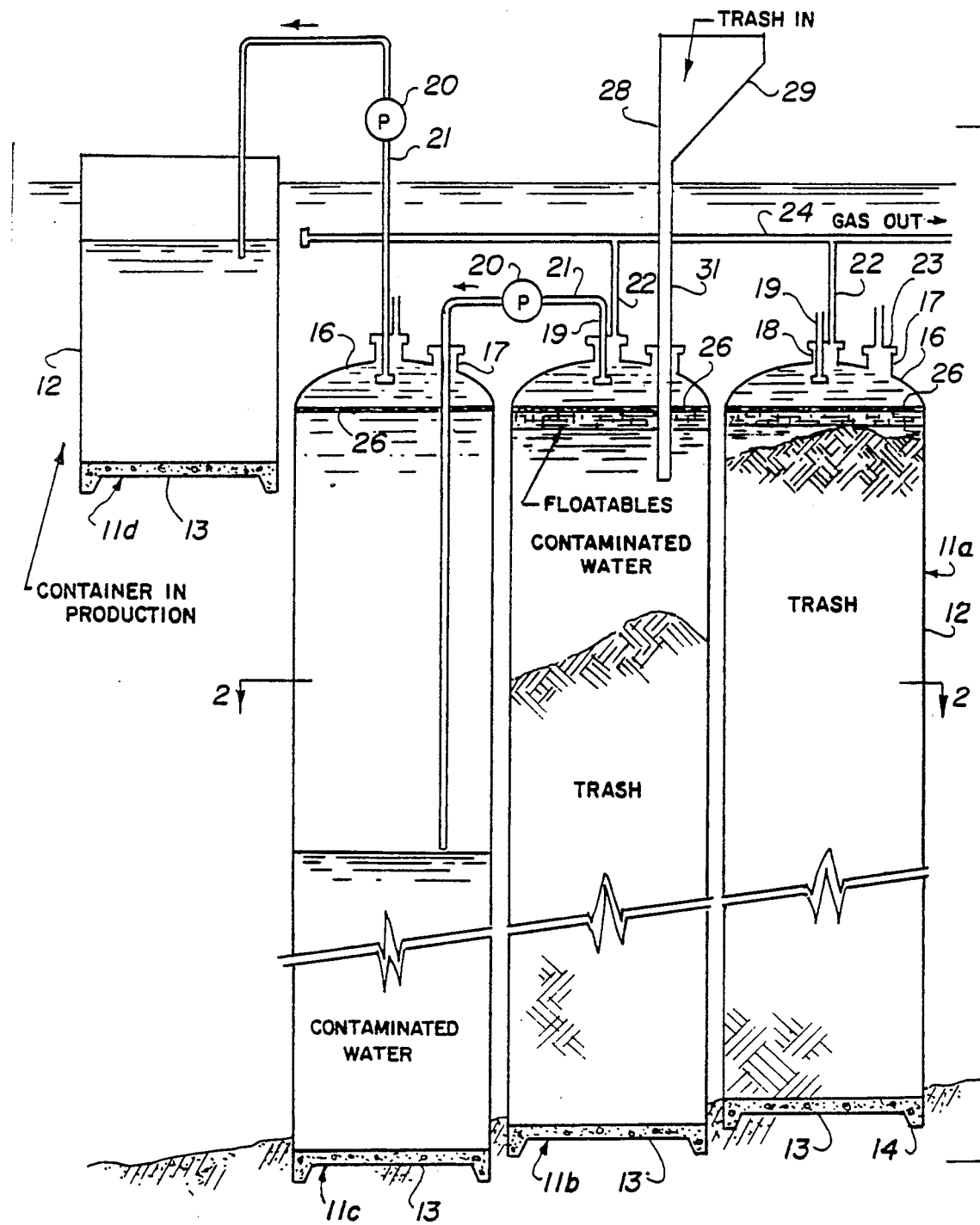
FIG. 1 is a fragmentary schematic vertical sectional view through a typical installation.

The present invention employs a plurality of cylinders 11. As shown in FIG. 1, cylinder 11a is filled, 11b is in the process of being filled, cylinder 11c awaits filling after cylinder 11b is filled and cylinder 11d is under fabrication. The materials of construction of the cylinders 11 is preferably a plurality of superimposed large diameter pipe sections of steel, concrete or other suitable material which will resist corrosion from the waste material to be charged therein The sections of the cylinder are welded or otherwise secured together by means of connections which will not leak over a long period of time. Each cylinder 11, therefore, comprises a smooth interior main chamber 12. The walls of the chamber need not be particularly strong in that the internal and external pressures are, after filling, substantially in equilibrium.

The lower end of main chamber 12 is fastened in an air- and water-tight fashion to bottom 13. Bottom 13 is preferably sufficiently strong so that it will not be pierced or punctured by sharp elements in the trash which will be filled into the chamber or sharp objects projecting from the bottom of a body of water. Optionally, a rim 14 may be formed on the periphery of bottom 13 to assist in anchoring bottom 13 to the floor of the ocean or other body of water in which the cylinders are located.

The upper end of main chamber 12 is closed off by a top 16, preferably dome-shaped, having a filling port 17 and also having a discharge port 18. Extending from the top of main chamber 12 through the discharge port 18 is a water outlet port which, as shown in FIG. 1, extends from cylinder 11b to an outflow pipe 21 which extends down into the filling port 17 of the adjacent cylinder 11c. For each filled or partially filled cylinder 11a, 11b, there is a gas outlet pipe 22 extending through discharge port 18 and connecting to a gas manifold 24 which may lead to a filter system or flare whereby the gases generated by decomposition of the trash may be purified and vented to the atmosphere. It will be understood that other means for handling the discharged gas may be used.

Adjacent the top of each main chamber 12 is a mesh barrier 26 which permits passage of liquids and gases but prevents low density solids from rising above the barrier 26 and clogging the discharge port 18.

A trash charger 28 is stationed above cylinder 11b which is being filled. Trash is delivered to hopper 29 and forced by means of a piston or an auger (not shown) through inlet conduit 31 which extends through the filling port 17 and through the mesh barrier 26.

Thus in use, as shown in FIG. 1, cylinder 11a is shown completely filled except for some water intermediate the compacted waste and the low density solids near the top. It will be noted that its gas outlet pipe 22 is connected to the gas manifold 24 so that over the passage of time as the trash therein decomposes, the gases generated will escape, preventing the cylinder 11a from breaching. Cylinder 11b is, meanwhile, being charged with trash which enters through the inlet conduit 31 into a position below mesh barrier 26 so that heavy, solid components settle on the bottom of the water layer while low density components float on top of the water and below the mesh 26. The weight of water above the high density components compacts the same. As the waste is filled, the contaminated water is displaced, rising to the top and flowing out through the water outlet pipe 19 into the outflow pipe 21 which is directed through the filling port 17 of the adjacent cylinder 1c adjacent the bottom thereof. A pump 20 may be used to transfer the contaminated water to the next cylinder. Hence when the trash substantially fills cylinder 11b, most of the water which was contained therein (and which is contaminated by the waste) has been displaced into the next cylinder 11c, while the water in cylinder 11c is displaced into cylinder 11d (see below). After cylinder 11b is substantially filled, then the trash charger 28 is installed above cylinder 11c and the filling process is repeated.

It will be noted in FIG. 1 that a fourth cylinder 11d is shown partially constructed. The construction is carried out near the surface of the water so that buoyancy reduces the work required for construction. Water from cylinder 11c is delivered into cylinder 11d as it is constructed, such water being the overflow from cylinder 11c. The cylinder 11d may be completely fabricated offsite or it may be fabricated in sections at the site. By the time cylinder 11b is filled, cylinder 11d will be ready to receive the displaced contaminated water from cylinder 11c while the latter is being loaded.

Figure 2:
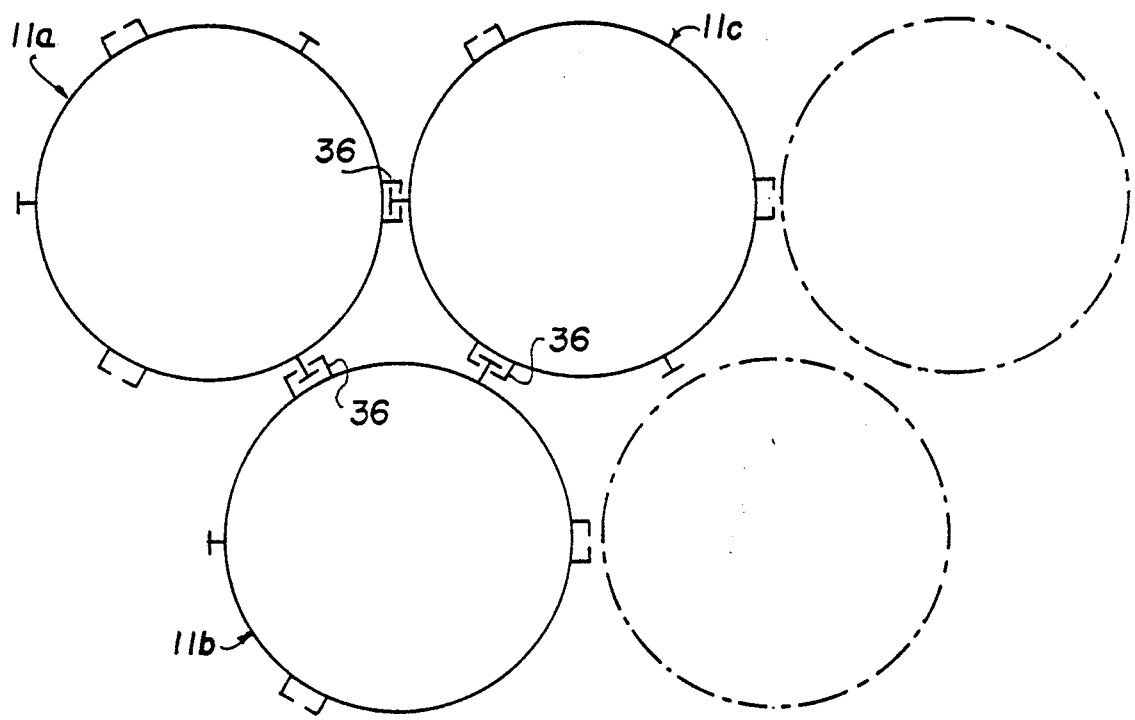
FIG. 2 is a schematic sectional view taken substantially along the line 2—2 of FIG. 1.
Figure 3:
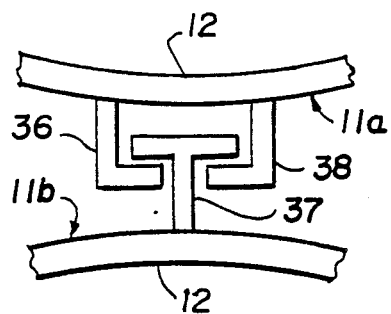
FIGS. 3 and 4 are enlarged fragmentary horizontal sectional views showing linkages between adjacent cylinders.

To make the cylinders 11 stable, as shown in FIG. 2, adjacent cylinders may be connected together. Other patterns will readily occur depending upon the nature of the site. Connecting the cylinders together makes them more stable as against water turbulence, tides, and other pressures. Various means may be used to join the cylinders together. The coupling 36 shown in FIG. 3 consists of a T-bar 37 secured to cylinder 11b which fits into opposed C-shaped receptacle 38 secured to cylinder 11a.

Figure 4A:
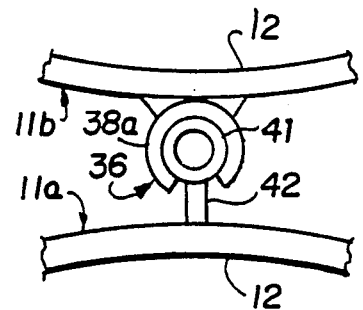
FIG. 4A is a view similar to FIG. 3 of a further modification.
Figure 4:
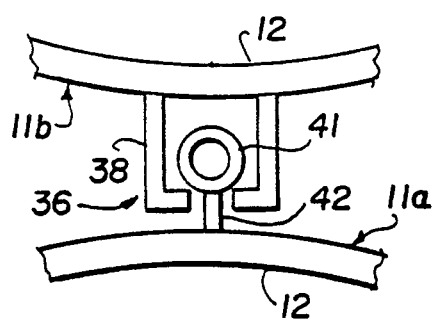

In FIG. 4, cylinder 11a has a vertical pipe 41 secured thereto by a connector 42 which, in the lower portion of FIG. 4, fits into a C-shaped receptacle 38 in the upper portion. In FIG. 4a, instead of the receptacle 38, a round, C-shaped receptacle 38a receives the pipe 41. The pipes 41 shown in FIG. 4 serve a second purpose. Water pumped under pressure may be used as jets to clear a site on the bottom of the body of water so that the bottom 13 has a firm surface upon which to rest.

Figure 5:
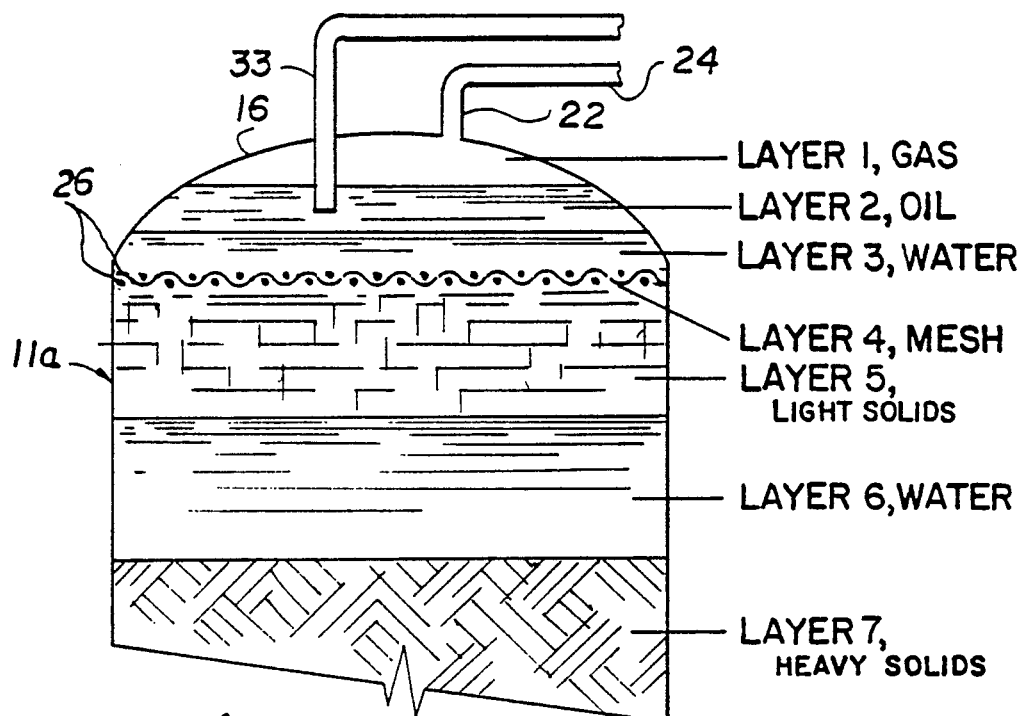
FIG. 5 is an enlarged fragmentary vertical sectional view showing layers of material which exist adjacent the upper end of a partially filled cylinder.

Directing attention now to the layers of material shown schematically in FIG. 5, layer 6 is of contaminated water which initially filled the entire cylinder 11a. As the trash was loaded into the cylinder, the heavy solids sank into layer 7 and were compacted by the weight of material thereabove, while the lighter solids floated on the contaminated water layer 6, forming layer 5. Such lighter solids were prevented from clogging the top 16 by the mesh barrier layer 4 (See barrier 26 in FIG. 1). As the heavy solids were loaded, the water in layer 6 was displaced, rising above the mesh 26 to form layer 3. In some instances, depending upon the characteristics of the trash, oil or other petroleum products or other liquids lighter than water will float on top of the layer 3 forming an oil layer 2. If there is sufficient oil accumulated in layer 2, it may be economic to employ a pipe 33 which enters the top 16, preferably through the discharge port 18, and is used to pump the layer 2 away from the cylinder 11a for collection, decontamination, and possible reuse. The lightest components are gases which collect in layer 1 at the top of the cylinder. These gases may initially be in the trash or may be generated upon decomposition of the components of the trash. Gas outlet pipe 22 is connected to the top 16, preferably through the discharge port 18 and thence to the gas manifold 24 (not shown in FIG. 5) for treatment or collection as heretofore described.

Figure 6:
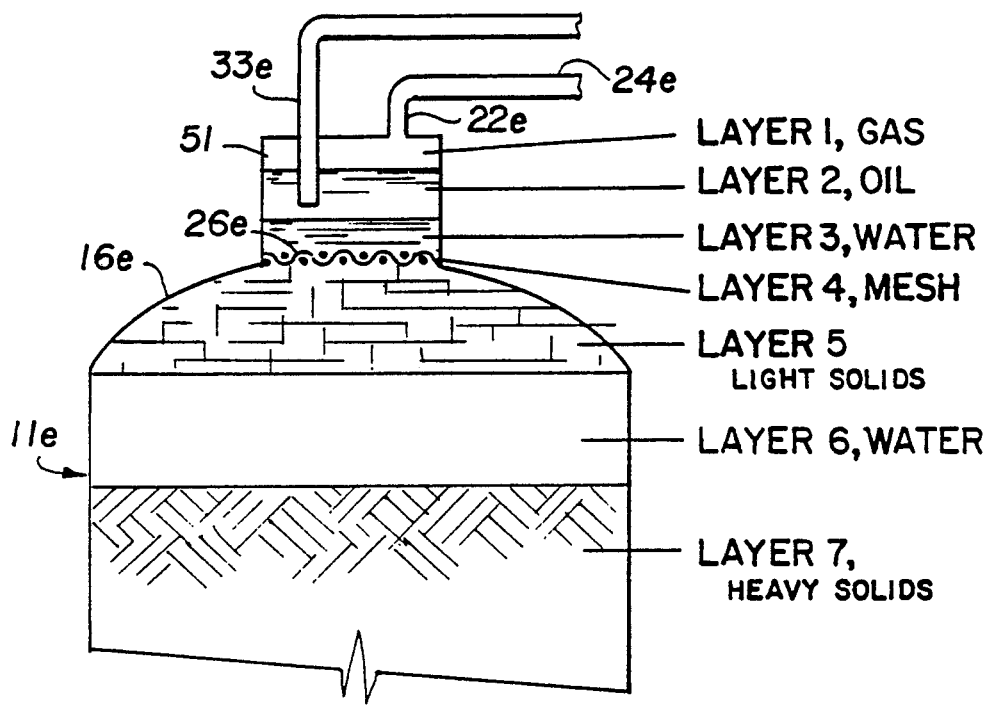
FIG. 6 is a view similar to FIG. 5 of a modification.

FIG. 6 shows a modified structure wherein a cylindrical head 51 is welded around a hole in the center of top 16e. Mesh 26e is welded to the bottom of head 51. Thus gas, oil and water collect above mesh 26e within head 51.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a system for disposal of solid waste,
    a first vertical cylinder resting on the bottom of a body of water, said first cylinder containing water, said first cylinder have an elongated main chamber, a bottom and a top,
    first means for charging solid waste into said first cylinder through its top,
    second means for transporting water displaced by said solid waste out of the top of said first cylinder,
    a second vertical cylinder similar to said first cylinder resting on said bottom in proximity to said first cylinder, said second cylinder containing water, said second means transporting water displaced by said waste charged into said first cylinder from the top of said first cylinder into the top of said second cylinder and third means for transporting water displaced out of the top of said second cylinder.

2. A system according to claim 1 which further comprises a third vertical cylinder adjacent said cylinder having a bottom and a portion of said main chamber, said third cylinder being partially completed, said third means transporting water from the top of said second cylinder into the top of said third cylinder.

3. A system according to claim 1 which further comprises fourth means for locking said first and second cylinders together.

4. A cylinder according to claim 1 which further comprises a mesh across the first-mentioned cylinder to confine solid waste below said tip.

5. A cylinder according to claim 1 which further comprises fourth means for collecting gas accumulating in said cylinders.

6. A cylinder according to claim 1 in which said top has a filling port and a discharge port.

7. A cylinder according to claim 6 in which said first means comprises a hopper into which waste is delivered and a conduit from said hopper, through said filling port and into said first-mentioned cylinder, said conduit terminating below said top.

8. A cylinder according to claim 7 which further comprises a mesh across said first-mentioned cylinder below said top and above the terminus of said conduit to confine solid waste from clogging said top.

9. A cylinder according to claim 6 which further comprises a gas outlet pipe extending from inside said cylinder below said top through said outlet port and a manifold to collect gas from said gas outlet pipe.

10. A cylinder according to claim 6 in which said second means comprises a water outlet pipe extending from the interior of said first cylinder through said outlet port of said first cylinder.

11. A cylinder according to claim 10 which further comprises a pump in said water outlet pipe.

12. A method of waste disposal comprising:

providing adjacent first and second vertical cylinders each having a bottom and a top, said cylinders resting on the bottom of a body of water which surrounds said cylinders, initially substantially filling said first cylinder with water through its top, charging solid waste into said first cylinder through its top and thereby displacing the water in said first cylinder while retaining the solid waste in said first cylinder, delivering the displaced water in said first cylinder out of the top of said first cylinder into said second cylinder through its top.

13. A method according to claim 12 which further comprises screening solids adjacent the top of said first cylinder to prevent said solids from clogging said top.

14. A method according to claim 12 which further comprises collecting gases accumulating in said first cylinder by piping said gases through the top of said first cylinder into a gas manifold.

15. A method according to claim 13 which further comprises forming a third cylinder at the surface of said body of water by connecting one section of said third cylinder to its bottom and then adding successive sections to said one section, said third cylinder gradually submerging as said sections are added, and forming water-and gas-tight joints between abutting sections.

16. A method according to claim 15 which further comprises partially filling said third cylinder with water as it is fabricated.

17. A method according to claim 16 in which said step of filling said third cylinder comprises transporting water from said second cylinder into said third cylinder.

* * * * *